United States Patent
Paolini et al.

(10) Patent No.: US 10,339,591 B2
(45) Date of Patent: Jul. 2, 2019

(54) DISTRIBUTING ILLUMINATION FILES

(71) Applicant: TeleLumen LLC, Saratoga, CA (US)

(72) Inventors: Steven Paolini, Saratoga, CA (US); John Giddings, Los Gatos, CA (US)

(73) Assignee: TeleLumen LLC, Saratoga, CA (US)

( * ) Notice: Subject to any disclaimer, the term of this patent is extended or adjusted under 35 U.S.C. 154(b) by 664 days.

(21) Appl. No.: 14/746,230

(22) Filed: Jun. 22, 2015

(65) Prior Publication Data

US 2015/0287110 A1    Oct. 8, 2015

Related U.S. Application Data

(60) Division of application No. 13/031,199, filed on Feb. 19, 2011, now Pat. No. 9,066,404, which is a
(Continued)

(51) Int. Cl.
*G06Q 30/00* (2012.01)
*G06Q 30/06* (2012.01)
(Continued)

(52) U.S. Cl.
CPC ..... *G06Q 30/0641* (2013.01); *G06Q 30/0601* (2013.01); *H05B 33/086* (2013.01);
(Continued)

(58) Field of Classification Search
CPC ........... G06Q 30/0641; G06Q 30/0601; H05B 37/0254; H05B 37/0245; H05B 37/029; H05B 33/086; Y02P 80/10
(Continued)

(56) References Cited

U.S. PATENT DOCUMENTS 5,521,708 A    5/1996 Beretta
5,924,784 A    7/1999 Chliwnyj et al.
(Continued)

FOREIGN PATENT DOCUMENTS

CN    101334729 A    12/2008
EP    1750428 A2    7/2007
(Continued)

OTHER PUBLICATIONS

"Mobile home automation: merging mobile value added services and home automation technologies," by Goetz Botterweck, J. Feliz Hampe, Stefan Stein, and Andreas Rosendahl, Information Systems and e-Business Management, vol. 7, published online Aug. 19, 2008, pp. 275-299. (Year: 2008).*
(Continued)

*Primary Examiner* — Anne M Georgalas
(74) *Attorney, Agent, or Firm* — Ascenda Law Group, PC

(57) ABSTRACT

Embodiments of the present invention relate to systems and methods for creating, distributing and playing illumination data files. The illumination data files, created using luminaire development systems are uploaded to a luminaire management system, where they are further processed and packaged for sale or license within a luminaire marketplace. Consumers and enterprises using luminaires may establish accounts with the luminaire management system and marketplace to access illumination data files for playback on individual or multiple luminaires. Consumers and enterprises may also create play lists and uniquely configure the luminaires to display various lighting effects based on user preferences, environmental factors or energy efficient settings.

21 Claims, 6 Drawing Sheets

Related U.S. Application Data continuation-in-part of application No. 12/215,463, filed on Jun. 26, 2008, now Pat. No. 8,021,021.

(51) Int. Cl.
    *H05B 33/08*    (2006.01)
    *H05B 37/02*    (2006.01)

(52) U.S. Cl.
    CPC ....... *H05B 37/029* (2013.01); *H05B 37/0245* (2013.01); *H05B 37/0254* (2013.01); *Y02P 80/10* (2015.11)

(58) Field of Classification Search
    USPC .............................................. 705/26.1, 27.1
    See application file for complete search history.

(56) References Cited

U.S. PATENT DOCUMENTS

| | | | |
|---|---|---|---|
| 6,525,855 | B1 | 2/2003 | Westbrook et al. |
| 6,548,967 | B1* | 4/2003 | Dowling ............ G06Q 30/0201 |
| | | | 315/318 |
| 6,683,423 | B2 | 1/2004 | Cunningham |
| 6,890,085 | B2 | 5/2005 | Hacker |
| 6,965,205 | B2 | 11/2005 | Piepgras et al. |
| 7,023,543 | B2 | 4/2006 | Cunningham |
| 7,046,160 | B2 | 5/2006 | Pederson et al. |
| 7,119,498 | B2 | 10/2006 | Baldwin et al. |
| 7,125,143 | B2 | 10/2006 | Hacker |
| 7,178,941 | B2 | 2/2007 | Roberge et al. |
| 7,202,613 | B2 | 4/2007 | Morgan et al. |
| 7,221,104 | B2 | 5/2007 | Lys et al. |
| 7,227,634 | B2 | 6/2007 | Cunningham |
| 7,415,612 | B2 | 8/2008 | Uchino |
| 7,529,004 | B2 | 5/2009 | Debevec et al. |
| 7,550,935 | B2 | 6/2009 | Lys et al. |
| 7,958,457 | B1 | 6/2011 | Brandenberg et al. |
| 8,021,021 | B2 | 9/2011 | Paolini |
| 8,469,547 | B2 | 6/2013 | Paolini |
| 9,028,094 | B2 | 5/2015 | Paolini |
| 9,066,404 | B2 | 6/2015 | Paolini et al. |
| 9,217,247 | B2 | 12/2015 | Behling et al. |
| 9,534,956 | B2 | 1/2017 | Paolini |
| 9,974,141 | B2 | 5/2018 | Simonian et al. |
| 2003/0057887 | A1* | 3/2003 | Dowling ............ H05B 37/0245 |
| | | | 315/291 |
| 2003/0063072 | A1 | 4/2003 | Brandenberg et al. |
| 2003/0095256 | A1 | 5/2003 | Cargill et al. |
| 2003/0097309 | A1 | 5/2003 | Gibler et al. |
| 2003/0107887 | A1 | 6/2003 | Eberl |
| 2004/0105261 | A1 | 6/2004 | Ducharme et al. |
| 2004/0218387 | A1 | 11/2004 | Gerlach |
| 2005/0046850 | A1 | 3/2005 | Chow |
| 2005/0168465 | A1 | 8/2005 | Tatsumi |
| 2005/0240494 | A1* | 10/2005 | Cue ...................... G06Q 10/107 |
| | | | 705/26.1 |
| 2005/0275626 | A1* | 12/2005 | Mueller ............. H05B 37/0245 |
| | | | 345/156 |
| 2006/0006820 | A1 | 1/2006 | Roseman et al. |
| 2006/0008119 | A1 | 1/2006 | Chang et al. |
| 2006/0114440 | A1 | 6/2006 | Sekigawa et al. |
| 2006/0176693 | A1 | 8/2006 | Walter et al. |
| 2007/0097252 | A1 | 5/2007 | Silverstein |
| 2007/0108846 | A1 | 5/2007 | Ashdown |
| 2007/0174773 | A1 | 7/2007 | Abernathy, Jr. et al. |
| 2007/0265979 | A1* | 11/2007 | Hangartner ............ G06Q 30/02 |
| | | | 705/59 |
| 2009/0290376 | A1 | 11/2009 | Salters et al. |
| 2009/0323321 | A1 | 12/2009 | Paolini |
| 2010/0091193 | A1 | 4/2010 | Hoogenstraaten et al. |
| 2012/0123637 | A1 | 5/2012 | Funayama et al. |
| 2012/0206050 | A1 | 8/2012 | Spero |
| 2013/0307419 | A1 | 11/2013 | Simonian et al. |
| 2017/0094741 | A1 | 3/2017 | Paolini |
| 2018/0270928 | A1 | 9/2018 | Simonian et al. |

FOREIGN PATENT DOCUMENTS

| | | |
|---|---|---|
| EP | 1876385 A2 | 9/2008 |
| GB | 2409287 A | 6/2005 |
| JP | 2003517705 A | 5/2003 |
| JP | 2005509245 A | 4/2005 |
| KR | 10-2011-0004205 A | 1/2011 |
| WO | 01/06316 A1 | 1/2001 |
| WO | 2001036864 A2 | 5/2001 |
| WO | 2002091805 A2 | 11/2002 |
| WO | 2003067934 A2 | 8/2003 |

OTHER PUBLICATIONS

Won, Euntae, Samsung Electronics "SG VLC Project Draft 5C", IEEEP802.15 15-08-0667-01-0vic, Sep. 2008, pp. 1-3.

Teleumen LLC et al., International Search Report and Written Opinion, ISA/KR, Sep. 21, 2012, 19 pages.

NewsRx. Telelumen LLC; Agency Reviews Patent Application Approval Request for "Method of Optimizing Light Output during Light Replication" Politics & Government Week (Oct. 11, 2012): 3662. Downloaded from ProQuestDirect on the Internet on Mar. 10, 2014, 2 pages.

Paolini, Steve, "Solid State Luminaires and Illumination Content" Strategies in Light Conference, 11th Annual Conference, Santa Clara, California, pp. 1-20 (Feb. 10-12, 2010).

Paolini, Steve, "Exploiting the Visible Spectrum Progress and Future" Strategies in Light Conference, 11th Annual Conference, Santa Clara, California, pp. 1-18 (Feb. 10-12, 2010).

Paolini, Steven, "Solid state lighting in buildings: status and future", Tenth Annual Conference on Solid State Lighting, San Diego, California, SPIE Proceedings, vol. 7784, 77840K, pp. 1-10 (Aug. 18, 2010).

Paolini, Steve, "Solid-Slate Lighting—Demyslifying the Pieces and Assembling the Future", Strategies in Light Conference, 12th Annual Conference, Santa Clara, California, pp. 1-39 (Feb. 22-24, 2011).

Notice of Allowance dated May 12, 2011, for U.S. Appl. No. 12/215,463, filed Jun. 26, 2008, 8 pages.

Response to Office Action filed Apr. 28, 2011, for U.S. Appl. No. 12/215,463, filed Jun. 26, 2008, 8 pages.

Non-Final Office Action dated Jan. 21, 2011, for U.S. Appl. No. 12/215,463, filed Jun. 26, 2008, 6 pages.

Notice of Allowance dated Feb. 20, 2015, for U.S. Appl. No. 13/031,199, filed Feb. 19, 2011, 12 pages.

Amendment filed Jun. 17, 2014, for U.S. Appl. No. 13/031,199, filed Feb. 19, 2011, 9 pages.

Final Office Action dated Mar. 17, 2014, for U.S. Appl. No. 13/031,199, filed Feb. 19, 2011, 18 pages.

Amendment filed Feb. 24, 2014, for U.S. Appl. No. 13/031,199, filed Feb. 19, 2011, 7 pages.

Non-Final Office Action dated Nov. 25, 2013, for U.S. Appl. No. 13/031,199, filed Feb. 19, 2011, 10 pages.

Notice of Allowance dated Feb. 26, 2013, for U.S. Appl. No. 13/105,837, filed May 11, 2011, 10 pages.

Response to Office Action filed Dec. 11, 2012, for U.S. Appl. No. 13/105,837, filed May 11, 2011, 9 pages.

Ex Parte Quayle Action mailed Oct. 11, 2012, for U.S. Appl. No. 13/105,837, filed May 11, 2011, 7 pages.

Response to Office Action filed Jul. 16, 2012, for U.S. Appl. No. 13/105,837, filed May 11, 2011, 10 pages.

Non-Final Office Action dated Mar. 16, 2012, for U.S. Appl. No. 13/105,837, filed May 11, 2011, 10 pages.

Final Office Action dated Nov. 6, 2015, for U.S. Appl. No. 13/475,851, filed May 18, 2012, 15 pages.

Response to Office Action filed Sep. 18, 2015, for U.S. Appl. No. 13/475,851, filed May 18, 2012, 11 pages.

Non-Final Office Action dated May 20, 2015, for U.S. Appl. No. 13/475,851, filed May 18, 2012, 10 pages.

Notice of Allowance dated Jan. 9, 2015, for U.S. Appl. No. 13/892,042, filed May 10, 2013, 7 pages.

Response to Office Action filed May 5, 2014, for U.S. Appl. No. 13/892,042, filed May 10, 2013, 7 pages.

(56) References Cited

OTHER PUBLICATIONS

Ex Parte Quayle Action mailed Apr. 18, 2014, for U.S. Appl. No. 13/892,042, filed May 10, 2013, 5 pages.
Response to Office Action filed Dec. 27, 2013, for U.S. Appl. No. 13/892,042, filed May 10, 2013, 6 pages.
Non-Final Office Action dated Sep. 27, 2013, for U.S. Appl. No. 13/892,042, filed May 10, 2013, 7 pages.
Notice of Allowance dated Aug. 26, 2016, for U.S. Appl. No. 14/682,391, filed Apr. 9, 2015, 8 pages.
Response to Office Action filed Apr. 28, 2016, for U.S. Appl. No. 14/682,391, filed Apr. 9, 2015, 9 pages.
Non-Final Office Action dated Jan. 28, 2016, for U.S. Appl. No. 14/682,391, filed Apr. 9, 2015, 12 pages.
Response to Office Action filed Oct. 6, 2015, for U.S. Appl. No. 14/682,391, filed Apr. 9, 2015, 7 pages.
Non-Final Office Action dated Jul. 6, 2015, for U.S. Appl. No. 14/682,391, filed Apr. 9, 2015, 9 pages.
Notice of Allowance dated Jan. 17, 2018, for U.S. Appl. No. 15/062,080, filed Mar. 5, 2016, 8 pages.
Response to Office Action filed Mar. 28, 2017, for U.S. Appl. No. 15/062,080, filed Mar. 5, 2016, 7 pages.
Non-Final Office Action dated Dec. 28, 2016, for U.S. Appl. No. 15/062,080, filed Mar. 5, 2016, 16 pages.
Response to Office Action filed Sep. 14, 2016, for U.S. Appl. No. 15/062,080, filed Mar. 5, 2016, 8 pages.
Non-Final Office Action dated May 16, 2016, for U.S. Appl. No. 15/062,080, filed Mar. 5, 2016, 10 pages.
Notice of Allowance dated Sep. 12, 2018, for U.S. Appl. No. 15/376,405, filed Dec. 12, 2016, 8 pages.
Response to Office Action filed Oct. 30, 2017, for U.S. Appl. No. 15/376,405, filed Dec. 12, 2016, 6 pages.
Non-Final Office Action dated Jun. 29, 2017, for U.S. Appl. No. 15/376,405, filed Dec. 12, 2016, 10 pages.

\* cited by examiner

DISTRIBUTING ILLUMINATION FILES

RELATED APPLICATIONS

This is a DIVISIONAL of U.S. patent application Ser. No. 13/031,199, filed 19 Feb. 2011, now issued as U.S. Pat. No. 9,066,404, which is a CONTINUATION-IN-PART of U.S. patent application Ser. No. 12/215,463, filed 26 Jun. 2008, now issued as U.S. Pat. No. 8,021,021, both of which are incorporated herein by reference.

FIELD OF THE INVENTION

Embodiments of the invention pertain to the field of lighting systems and methods for distributing and playing files that display lighting preferences.

BACKGROUND

The portion of the electromagnetic spectrum with wavelengths between about 350 nm and 750 nm, which includes visible light, is useful for many purposes. For example, these wavelengths enable human vision and photosynthesis by providing enough energy to do useful work in biological systems but not so much energy as to destroy the biological systems. The sun produces vast amounts of radiation in this spectral range and the earth's atmosphere allows transmission of these wavelengths to the surface. Other natural light sources such as fire and lightning as well as man-made sources such as incandescent, fluorescent, and solid state lighting also produce electromagnetic radiation or light in this spectral range.

Lighting from the sun is arguably the "gold standard" of illumination since humans are adapted to live in solar illumination. For the sun, the quantity of light varies with time from darkness to blinding. The sun has both intense collimated light from a small area (the solar disk) and subdued diffuse light from a large area (blue sky). The spectral distribution, location, and direction of light from the sun also change in a relatively consistent way as the sun moves across the sky. These solar lighting patterns affect many biological processes such as the human wake-sleep cycle and plant and animal lifecycles, which are often influenced by solar patterns.

The dynamic variation in illumination from man-made light sources is generally much smaller than the dynamic variation in the illumination from the sun. In the cases of candles, incandescent bulbs, fluorescent tubes, and discharge lamps, the spectrum and to a large degree the amount of light provided are fixed at the time of installation. Some dimming and spectral change are possible over a limited range, but illumination from the vast majority of these lighting systems is static. In addition, where dimming or spectral modifications are possible, the dimming often decreases the energy efficiency of the light source, and spectral modifications, which are conventionally achieved with optical filters, can be very wasteful of energy. Other light qualities like location, direction, and beam divergence are also fixed in most installations. However, the value of human vision is so great that this static, inflexible illumination is acceptable in many cases.

Lighting systems and methods are desired that provide greater flexibility and dynamic qualities.

SUMMARY OF THE INVENTION

In accordance with an aspect of the invention, lighting systems and methods improve several aspects of light quality over conventional approaches. In particular, illumination data can define continuous broad spectrum lighting that can be produced using a player and luminaires containing multiple solid state emitters such as LEDs. The illumination data, which may be recorded from an existing natural or manmade lighting environment or authored, can include spectral, temporal, and spatial information defining the qualities of the light produced. The intensities of individual emitters in the luminaires can be controlled through a combination of pulse width modulation (PWM) and amplitude modulation (AM) of drive currents. The combination of PWM and AM permits fine tuning of the spectrum of emissions and creation of free space optical data channels.

In accordance with one specific embodiment of the invention, a process produces illumination data to represent a desirable spectral distribution and uses the illumination data to control operation of a light source containing multiple emitters such as LEDs with different peak wavelength emissions. In particular, the light source operates the emitters so that respective intensities of light from the emitters are determined from the illumination data and a combination of the respective intensities of the emitters produces the desired spectral distribution. The illumination data can be produced by a variety of techniques ranging from recording the illumination characteristics in a specific environment to authoring the illumination data from scratch to achieve a desired function or aesthetic effect.

In accordance with another specific embodiment of the invention, a system includes one or more light sources and a player connected to the light source or sources. Each light source includes multiple emitters such as LEDs with each of the emitters having an emission spectrum that differs from the emission spectra of the other emitters. The player is connected to independently control the intensity of light emitted from each of the emitters. The player is further capable of accessing illumination data representing a spectral distribution and uses illumination data to determine respective intensities of emissions from the emitters required to produce the illumination represented by the illumination data.

In accordance with yet another embodiment of the invention, a business method includes creating illumination data that represents information including the spectral distribution of a desired illumination. The illumination data can be sold in a file format that can be played through a lighting system to reproduce the desired illumination.

In accordance with another embodiment of the invention, a luminaire development system communicates with a luminaire management system, which in turn is coupled to customer client devices and/or luminaires. The luminaire development system allows luminaire programmers (i.e., "Lumenists", or Lumen Artists) to create and upload luminaire data files to the luminaire management system and marketplace. In one embodiment, the luminaire management system processes, validates and creates data and quality control standards for illumination data files that are authorized or licensed for playback on customer luminaires. Customers may purchase customer illumination data files and create unique play lists or personalities for luminaires, thus controlling the lighting effects, preferences and playback on individual or multiple luminaires.

BRIEF DESCRIPTION OF THE DRAWINGS

The present invention is illustrated by way of example, and not limitation, in the figures of the accompanying drawings, in which.

Use of the same reference symbols in different figures indicates similar or identical items.

DETAILED DESCRIPTION

The emergence of solid state light sources, most notably LEDs (light emitting diodes) has provided much longer lasting, more robust, and more energy-efficient alternatives to conventional vacuum and combustible light sources. However, while most conventional light sources are broad spectrum (e.g., white light) emitters, LEDs are generally narrow spectrum emitters that intrinsically produce colored light with a relatively narrow distribution of wavelengths. Since white light is often preferred, LED systems using a blue LED and yellow phosphor have been developed that appear white. However, the light from conventional LED systems is generally less than ideal for many lighting applications. In accordance with an aspect of the present invention, multiple LEDs with different colors or emission peaks can be combined to produce illumination with a desired spectrum, rather than simply providing the appearance of a specific color such as white.

Figure 1:
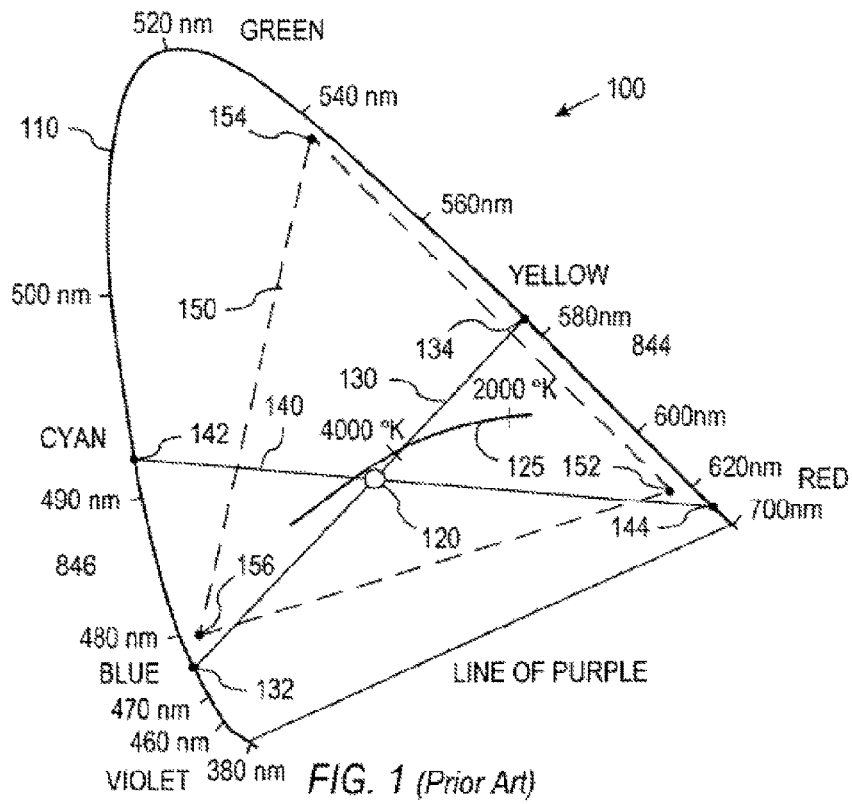
FIG. 1 is a chromaticity diagram illustrating the apparent color of light sources containing a few narrow band emitters.

The apparent color of a light source can be roughly determined using a chromaticity diagram such as an International Commission on Illumination (CIE) chromaticity diagram 100 as shown in FIG. 1. Chromaticity diagram 100 has a border 110 that corresponds to spectral colors in the visible spectrum, i.e., monochromatic light with wavelengths between about 380 nm and about 700 nm. Points inside border 110 in chromaticity diagram 100 correspond to colors perceived by the human eye in response to combinations of spectral colors. In particular, a point or region 120 corresponds to the color white, which can be produced using many different combinations of spectral colors. For example, white light can be produced by a black body that is heated to the correct temperature. In FIG. 1, a curve 125 represents the apparent color of blackbody radiation over a range of temperatures of an ideal blackbody. As is well known, a blackbody begins to glow with a reddish color at about 1500 K, changes through orange and yellow as the temperature of the blackbody rises, and appears whitish at temperatures between about 4000 and 6000 K. Incandescent lights generally produce light that appears white through electrical heating of a filament, and the light from an incandescent bulb can be similar to blackbody radiation.

The spectrum of blackbody radiation is a continuous spectrum, but the appearance of white can also be achieved using just two spectral colors. In particular, if a line connecting two points in chromaticity diagram 100 passes through the region 120 corresponding to white, two light sources with colors corresponding to those points when combined with the proper intensity ratio appear white. FIG. 1 specifically illustrates that a line 130 connecting points 132 and 134 respectively corresponding to spectral colors blue and yellow passes through region 120, and a combination of the blue and yellow light will appear white if the ratio of the intensities of the two colors corresponds to a point in region 120. A line 140 also crosses region 120 showing that other colors, e.g., cyan (point 142) and red (point 144) could alternatively be used to generate the appearance of white. However, a two color system is not very flexible as a light source. In particular, a two color light system can only produce the appearance of colors on lines connecting the corresponding points in a chromaticity diagram. Further, illumination using two color sources cannot provide the full spectral content of a natural light source such as the sun, and therefore the lighting suffers the problem of metamerism, as described further below.

Producing the sensation of a range of colors, for example, for a color video display, generally requires illumination with at least three colors. Most commonly the three colors are red, green, and blue, for example, points 152, 154, and 156 in chromaticity diagram 100. Varying the ratios of the intensity of these primary colors can generate any color (including white) within a triangle 150 having points 152, 154, and 156 as vertices as shown on diagram 100. Most video displays (TV, computer, stadium screen, etc.) use variations of the relative intensities of red, green, and blue light to produce the sensation of a relatively full range of colors. The sensation of different colors can be achieved because human eyes normally have three types of cones, and the respective cones are most sensitive to red, green, and blue light. Since LEDs can be made in red, green, and blue, LED displays using three colors can produce color changeable or static colored light for displays, accent, or illumination.

While a three primary color system does a good job of creating the sensation of many colors, such a system does not come close to accurately representing the continuous spectrum and specific spectral power distributions of broad spectrum sources such as the sun, fire, or an incandescent bulb. Accordingly, a three primary color system is not completely satisfactory as a source of illumination, particularly for objects with significant reflectance in between or beyond the three primary colors emitted. Differences in an illumination spectrum generally can change the appearance of objects, and most people would prefer sunlight or at least continuous spectrum sources to look at an object for the best viewing of color. Another benefit of continuous spectrum sources, particularly the sun, over illumination using three primary colors is the presence of short wavelength light that can cause fluorescence in the objects illuminated. The fluorescence helps give sparkle to objects that can otherwise look dull under poor lighting.

As previously alluded, a situation known as metamerism exists where two objects with different spectral characteristics look the same under illumination by one light source but not under illumination by another light source. This situation can sometimes be avoided or remedied by tailoring the spectral characteristics of an object during manufacturing or by limiting the spectral characteristics of the lighting of the object. However, these options are often not available or produce sub-optimal results, and an observer can be left frustrated that objects appear to have different colors in different lighting. An example of this occurs when a customer buys black pants and an apparently black blazer in a store with fluorescent lighting only to find later that the blazer is actually navy blue when viewed in sunlight.

Broad spectrum lighting may have benefits in addition to improving the apparent color of objects. Cones, which are eye cells that resolve colors, occupy an important region of the human eye, but the eye also contain rods that extend over a larger portion of the retina. Cone density varies over the eye (including highest density at the fovea). Red, Green and Blue (also called the L, M, S) cones have peak sensitivity near 564-580 nm, 534-545 nm, and 420-440 nm, respectively. The rods are important for peripheral vision and vision in low lighting. Rods have a scotopic curve that peaks at a light wavelength of about 507 nm. Human eyes also have sensors that are in a layer of ganglion cells that cover most of the inside surface of the eye. These sensors can sense non-visual information and are believed to be responsible for the regulation of various bodily functions such as the sleep/wake cycle and hormone production. The peak sensitivity for these cells occur about 480 nm, which is between blue and green and roughly the color of blue sky. The wavelengths of peak sensitivities of these cells are not normally an important region of the spectrum emitted by traditional LED lighting. Fixtures that produce light in the correct spectral regions can thus have biological benefits and improve vision under lower lighting conditions. A programmable, continuous spectrum light source can address these and other conditions that are important for a given situation.

Figure 2:
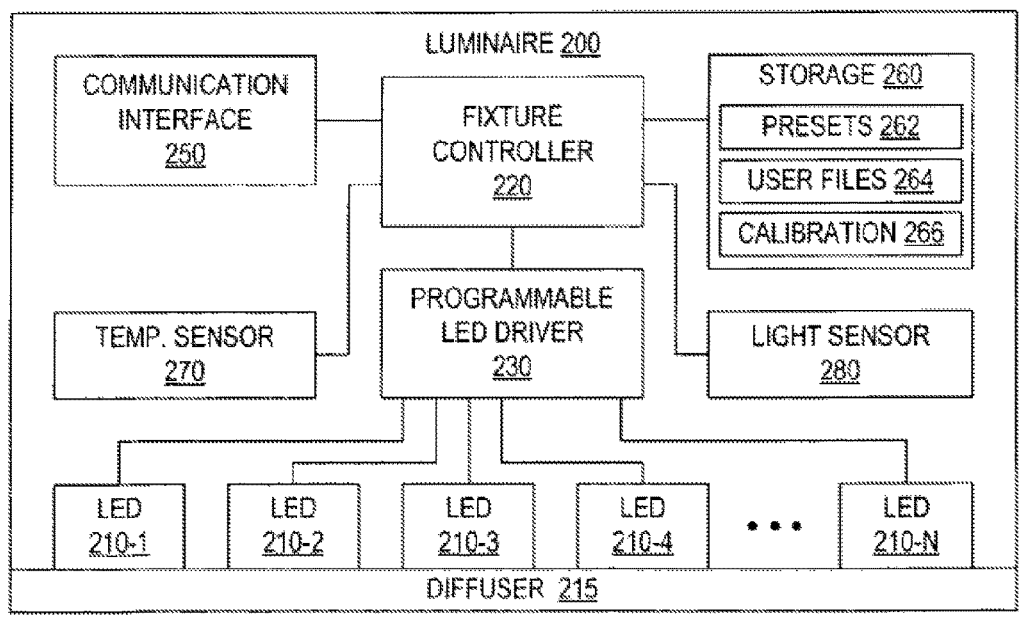
FIG. 2 shows a luminaire in accordance with an embodiment of the invention using narrow band light sources to provide illumination having a broad wavelength range.

The color anomalies and failure of lighting to provide light having wavelengths corresponding to peak sensitivities of specific biological systems can be virtually eliminated through use of many narrow spectrum sources that collectively provide illumination that continuously covers an extended portion of the visible spectrum or beyond. FIG. 2 illustrates a luminaire 200 in accordance with an embodiment of the invention containing multiple types of LEDs 210-1 to 210-N. The different types of LEDs 210-1 to 210-N have different emission spectra and collectively can be configured and operated to produce a recorded or authored spectral distribution over a broad range of wavelengths, e.g., a range that covers most of the visible spectrum and that may extend to ultraviolet or infrared wavelengths. The number N of types of LEDs 210-1 to 210-N required to cover the desired range of wavelengths generally depends on the range and the widths of the emitted spectra of LEDs 210-1 to 210-N. In an exemplary embodiment, LEDs 210-1 to 210-N have different colors (e.g., from 5 to 50 different colors) with peak emission wavelengths in a range from about 400 nm to about 700 nm, and the peak emission wavelengths of LEDs 210-1 to 210-N can be separated by steps of about 5 nm to about 50 nm to continuously cover the visible spectrum when individual LED spectra have FWHM of about 15 to 35 nm. A diffuser 215, which is an optical device such as a frosted plate of a transparent material, can be used to mix light from the LEDs 210-1 to 210-N to provide more spatially uniform lighting that combines light from all LEDs 210-1 to 210-N. Additionally, LEDs 210-1 to 210-N of the same type can be scattered in different locations within an array of LEDs 210-1 to 210-N for better spatial uniformity of the spectrum of emitted light.

LEDs having different peak emission wavelengths can be produced using different materials or structures and would normally be provided on separate chips. However, the part of the spectrum between about 540 nm and 590 nm is inefficient for direct emission from current LEDs because this wavelength range is near the extremes of the two dominant LED material systems, InGaN (540 nm) and AlInGaP (590 nm). Phosphors (not shown) can be added to one or more LEDs 210-1 to 210-N to convert direct LED emissions to the desired wavelengths through fluorescence. A disadvantage to the phosphor conversion when compared to direct LED emissions is degraded spectral resolution. LED phosphor emissions generally have much broader spectral profiles than do the direct emissions from an LED, and the emitted spectrum from the LED-phosphor combination may contain an emission peak corresponding to fluorescence and a second peak from the intrinsic emitted wavelength of the LED. These effects could limit the ability to tune the overall spectrum of light emitted from luminaire 200. Even so, phosphor converted LEDs are likely to have an important role in continuous-spectrum products.

A consequence of using LEDs of wavelengths across the visible spectrum may be a loss of energy efficiency because current LED technology produces light of some wavelengths less efficiently. The number of LEDs of each type (i.e., having the same or very similar peak emission wavelengths) may differ to enable a more uniform maximum intensity across the spectrum. For example, the number of LEDs of a specific type in luminaire 200 may be selected, so that the LEDs of each type have the same combined maximum intensity. Use of less efficient LEDs reduces overall energy efficiency of luminaire 200 but may be unavoidable when accuracy of the final spectrum is the priority. Alternatively, more LEDs of the most energy efficient type or types can be included in luminaire 200 for use when energy efficiency is preferred over spectral accuracy, for example, for outdoor lights that are on much of the time. Luminaire 200 may also employ light sources that have broader spectra in addition to or in place of LEDs with narrow spectra that cover the same range of wavelengths. In particular, when the available LEDs are less efficient at producing light with specific wavelengths, luminaire 200 can include LEDs with phosphors that fluoresce to produce light with the wavelengths that are less efficiently produced by direct emission from LEDs. The broad spectrum sources may be used when spectral resolution is less important than energy efficacy.

Figure 3A:
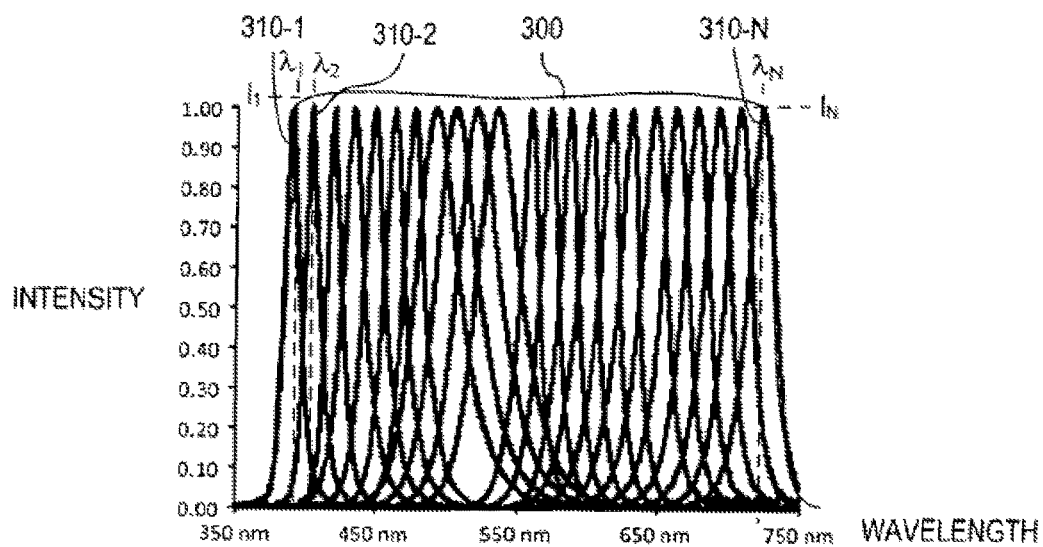
FIG. 3A shows a programmable spectral distribution from a light source in accordance with an embodiment of the invention.
Figure 3B:
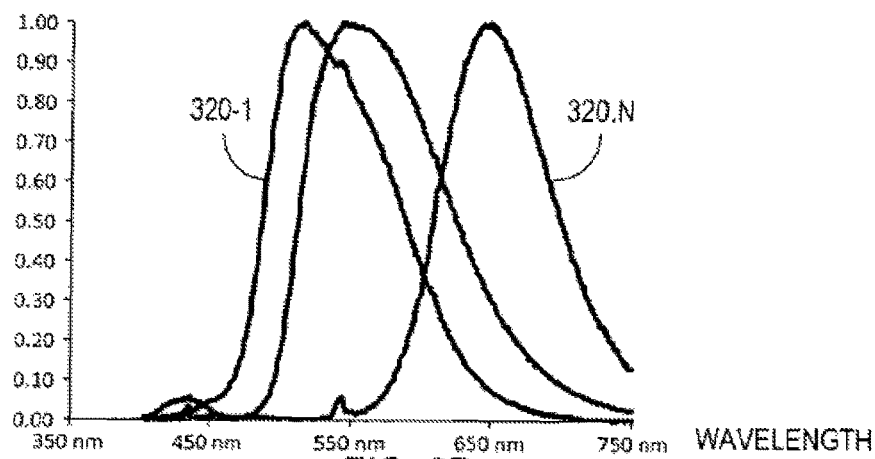
FIG. 3B shows the spectra of phosphor converted LEDs that can be used with the spectra of direct LED emissions to produce a programmable spectral distribution.

In addition to LEDs 210-1 to 210-N, luminaire 200 contains a fixture controller 220 that operates a programmable LED 230 driver to individually adjust the intensity of light emitted from each of LEDs 210-1 to 210-N. In particular, the intensities emitted from LEDs 210-1 to 210-N can be adjusted to provide lighting that approximates any desired spectral power distribution over the range of wavelengths of LEDs 210-1 to 210-N. FIG. 3A illustrates an example of a spectral distribution 300 that is the sum of narrow band distributions 310-1 to 310-N respectively having characteristic peak wavelengths $\lambda_1$ to $\lambda_N$ of respective LEDs 210-1 to 210-N. The illustrated spectral distribution 300 corresponds to white light having roughly equal intensities of light for all wavelengths between about 350 nm and 750 nm. However, peak intensities $I_1$ to $I_N$ of narrow band spectral distributions 310-1 to 310-N for LEDs 210-1 to 210-N have magnitudes under the control of driver 230 of FIG. 2. Fixture 200 can thus reproduce a desired spectrum by separately adjusting each of intensities $I_1$ to $I_N$. The accuracy with which a spectral distribution can be reproduced generally depends on the number of different peak wavelengths $\lambda_1$ to $\lambda_N$, the widths of the emission spectra of the types of LEDs 210-1 to 210-N, and the dynamic range of intensity of each of LEDs 210-1 to 210-N. To optimize spectral accuracy, a large number of (e.g., on the order of 20 to 50) types of LEDs 210-1 to 210-N are desired with each type having a different wavelength for peak emissions. The widths of the emission spectra of each type should be as narrow as possible while still overlapping with the emission spectra of other LEDs 210-1 to 210-N of other types. However, light sources of phosphor converted LEDs which have wider distributions, such as the spectral distributions 320-1 to 320-N shown in FIG. 3B, can be used when the accuracy of the reproduced spectrum is less important or when light sources having wider spectrum are more efficient at producing light with a desired wavelength.

Driver 230 can generally dim each of LEDs 210-1 to 210-N to almost any desired extent by pulse width modulation (PWM) and/or amplitude modulation (AM) of the respective drive currents of the LEDs 210-1 to 210-N. In one embodiment of the invention, independent drive currents respectively control the intensities of LEDs 210-1 to 210-N, and LED driver 230 modulates the amplitudes of the drive currents to the LEDs 210-1 to 210-N and alters the on-time of the drive currents for both PWM and AM control. The use of both PWM and AM has advantages over just using one or the other. In particular, a desired overall dynamic range of illumination intensity for luminaire 200 may be 100,000:1 or greater. A range of AM between 10:1 and 1000:1 would thus be desirable. If AM is not used in control of drive currents in luminaire 200, a large magnitude current would be needed to achieve the desired maximum lumens, and dimming can only be accomplished with shorter pulses of drive current. Operating at near darkness illuminations then requires short pulses with fast edges, generating more noise (EMI) which has to be abated in some way. Further, the efficiency of an LED is often inversely proportional to the drive current, and use of short high current pulses does not provide maximum energy efficiency. This is particularly true of the InGaN materials used for short to mid wavelengths and phosphor converted white. For example, a reduction by a factor of 10 in the drive current to an InGaN-based LED can result in a 70% increase in efficiency. Energy lost as heat (or $I^2R$ losses) in driver 230 and wiring also goes up as the drive current goes up. The ability to adjust the magnitude of the drive current can avoid these problems with using PWM alone, and combining AM and PWM may also provide a way of tuning the emission spectrum of each LED 210-1 to 210-N because the peak emission wavelength of an LED often has at least some correlation to the amplitude of the drive current.

Uses of PWM or AM are not limited to static and relatively slow lighting effects. LEDs can be turned on and off very rapidly, much faster than the eye or even many machines could detect. The rapid switching speed of LEDs 210-1 to 210-N could be exploited to transmit data and in many cases at the same time as static or average illumination is being used for other purposes. Further with the multiplicity of different wavelength sources, each LED 210-1 to 210-N could operate for transmission of a separate data channel, which could greatly increase the available data bandwidth.

Luminaire 200 of FIG. 2 used as described above can accurately reproduce or approximate the spectral and brightness characteristics of many different light sources or produce lighting according to a pattern created by an author or engineer. In one embodiment of the invention, luminaire 200 uses illumination data to define specific illumination that luminaire 200 produces. The illumination data can be input into luminaire 200 through a communication interface 250 or stored in a storage system 260. In an exemplary embodiment, communication interface 250 connects luminaire 200 to a network that may include similar luminaires or control devices and can further be part of a user interface that allows a user to control luminaire 200, for example, to select active illumination data for operation of luminaire 200. Storage system 260 in luminaire 200 can be used to store illumination data and executable code for fixture controller 220 and may be any type of system capable of storing information. Such systems include but are not limited to volatile or non-volatile IC memory such as DRAM or Flash memory and readers for removable media such as magnetic disks, optical disks, or Flash drives.

FIG. 2 illustrates storage 260 as containing two types of illumination data including presets 262 and user files 264. Presets 262 are factory installed illumination data files that represent default lighting or lighting that would be useful to a wide number of users. The presets might include, for example, the spectra of common natural light source such as the sun at noon on a cloudless summer day or a full moon, the spectra of flame based light sources such as candles or a camp fire, the spectra of common electrical light sources such as incandescent or fluorescent lights, and the spectra that provide luminaire 200 with optimal energy efficiency for human vision over a range of different intensities. User files 264 are illumination data that a user has chosen to store in luminaire 200. User files 264 can include illumination data of the same types as mentioned for the presets but additionally include illumination data that are of particular interest for a specific user. For example, an individual may load into storage 260 illumination data that provides light having spectral content and time variation that is optimized for their sleep cycle or the sleep cycle of their child. A researcher may load into storage 260 illumination data that create lighting that provides the desired spectral content for an experiment or lighting that optimizes the growth of particular plants or organisms.

There are many different types of lighting that can be represented by illumination data files that can be stored as presets or user data in storage 260. To list a few examples, luminaire 200 can reproduce or approximate the spectrum of light from a natural source such as the sun or the moon as it would appear on specific days, times, and locations. Illumination data can represent light with a spectrum mimicking a conventional manmade light source such as an incandescent light of any of a variety of types, a fluorescent light, a gas flame, a candle, an oil lamp, a kerosene lantern, an arc-lamp, or a limelight, or represent light with a spectrum having a specific utility such as a black light, a bug light, a film-safe light, a grow lamp, or colored light corresponding to any desired filter effect. All of these different types of lighting which may be represented by illumination data can be reproduced by luminaire 200. Luminaire 200 can also produce light having a spectrum of a light source that does not normally exist such as 20000 K CCT (Correlated Color Temperature) light, which cannot be easily made because the filament would melt. Also, as mentioned above, the illumination data can be tailored for luminaire 200 to provide optimal energy efficiency, for example, to change the shape of the spectrum of luminaire 200 with brightness level for best human vision or other useful purpose per amount of energy consumed.

Illumination data could have a variety of different file formats suitable for representing the desired lighting information. A static spectral distribution, for example, may be simply represented using a set of samples corresponding to a set of different wavelengths of light. Alternatively, a static spectral distribution could be represented by the coefficients of a particular transform, e.g., Fourier transform, of the spectral distribution. Further information in the illumination data could represent how the spectral distribution changes with time or absolute intensity. The illumination data could further include positional or directional information to indicate spatial variations in the spectrum and intensity of lighting, particularly when luminaire 200 is used with other similar lighting fixtures to illuminate a room or other environment.

Fixture controller 220 decodes the illumination data that a user selects for operation of luminaire 200 and programs driver 230 as needed to cause LEDs 210-1 to 210-N to produce the lighting called for in the illumination data. In general, fixture controller 220 can employ data from multiple sources in order to determine the correct programming of driver 230. For example, fixture controller 220 can interpolate between samples provided in the active illumination data when the peak wavelengths emitted from LEDs 210-1 to 210-N differ from wavelengths represented in the selected illumination data. Calibration data 266, which may be factory set in storage system 260, can indicate the peak emitted wavelengths respectively measured from LEDs 210-1 to 210-N as well as other LED performance data such as emission intensity dependence on drive current, temperature, or other factors. For each LED, fixture controller 220 can then use calibration data 266 and temperature data from a temperature sensor 270 to determine the drive signal needed for that LED to produce the required contribution to the spectral distribution represented in the selected illumination data. A light sensor 280 can be employed to monitor the emitted light from LEDs 210-1 to 210-N to allow fixture controller 220 to adapt the calculation of the required drive signals according to changes in performance that occur as luminaire 200 ages or is used.

Luminaire 200, which can produce virtually any illumination spectral power distributions within the power limits of the LEDs 210-1 to 210-N, can be used with other similar luminaires to produce desired spatial pattern in lighting. The spatial pattern of the lighting may be subject to temporal variations in the same way the spectral content may vary. For example, lighting that reproduces the path of solar illumination from dawn to dusk would include spatial, spectral, and intensity variations over the course of a day. A system implementing desired spatial, spectral, and intensity patterns for lighting could be employed, for example, in scene lighting or home lighting.

Figure 4:
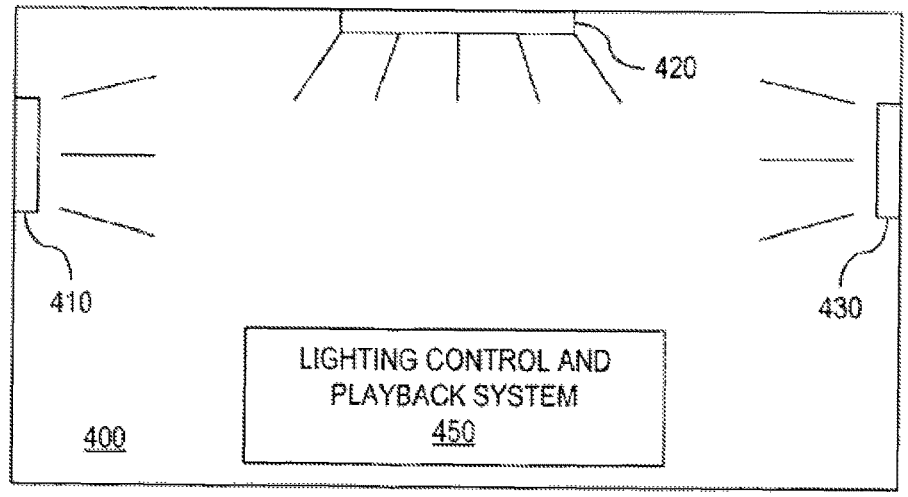
FIG. 4 illustrates a system in accordance with an embodiment of the invention for illuminating a room.

FIG. 4 illustrates a room 400 containing a lighting system in accordance with an embodiment of the invention providing lighting with spatial variations. Room 400 includes multiple light sources 410, 420, and 430. Each light source 410, 420, or 430 can be a flexible luminaire such as luminaire 200 of FIG. 2 and therefore be capable of producing light having a programmable spectral profile. A lighting control or player system 450 is in communication with light sources 410, 420, and 430 and may be a separate unit as illustrated in FIG. 4 or may be physically incorporated in one or more of luminaires 410, 420, and 430. Player system 450 can include specially designed hardware or a general purpose computer executing software to implement the desired lighting functions.

Luminaires 410, 420, and 430 can act as a network under control of player system 450 to provide room lighting with the desired spectral, temporal, and spatial distribution. A variety of physical and logical arrangements of multiple luminaires 410, 420, and 430 are possible. For example, each luminaire 410, 420, and 430 could have a network address, all luminaires 410, 420, and 430 could be connected in a serial fashion, or luminaires 410, 420, and 430 could be configured and addressed in rows and columns to provide an area with overhead lighting. Preferably, the configuration used allows player system 450 independent communications with each luminaire 410, 420, or 430.

During setup or operation of lighting in room 400, player system 450 can poll the characteristics of each particular luminaire 410, 420, or 430 to determine light source characteristics, which may include static and dynamic information. The static information could, for example, include the positions of luminaires 410, 420, and 430 and the number of colors and type of emitters in each of luminaires 410, 420, and 430. The dynamic information can include the temperatures, ages, and number of luminaires 410, 420, and 430. Player system 450 can further include sensors capable of measuring the spectral distribution of light at one or more points in room 400. Based on the measured light or the determined characteristics of luminaires 410, 420, and 430 and the selected illumination data, player system 450 selects spectral distributions for respective luminaires 410, 420, and 430, and player system 450 or luminaires 410, 420, and 430 can calculate the drive currents of the emitters in luminaires 410, 420, and 430 needed to produce the desired lighting in room 400.

Player system 450 is capable of executing complex lighting programs that include specific spectral and spatial distributions and time variations of the spectral and spatial lighting in room 400. For example, the spatial and spectral information in an illumination data file could mimic large scale illumination sources, such as the sky, from content specifically recorded for playback in lighting systems. Lighting in room 400 could thus reproduce the spectral distribution of diffuse lighting from the sky recorded from a specific location and time of the day and year. Further, lighting in room 400 could additionally mimic time variations in the spectral distribution of the sky over a day or season in real time or at a compressed or extended time scale. A bright localized lighting associated with the sun could be super imposed over the sky light program. Player system 450 could alternatively be switched to reproduce lighting in room 400 that mimics the flickering and spectral characteristics of a camp fire or candle light, the light from incandescent bulbs, or even a lightning strike. More generally, player system 450 can be operated to produce any lighting that may be represented in an illumination data file recorded or authored for that purpose.

Figure 5:
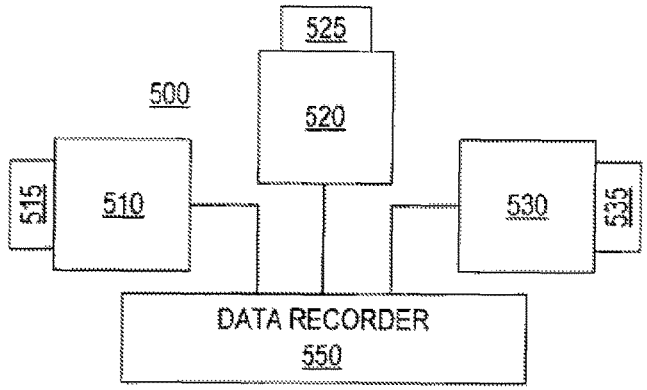
FIG. 5 illustrates a system in accordance with an embodiment of the invention for recording illumination data.

In accordance with a further aspect of the invention, a recorder system can be employed to capture the spectral, temporal, and directional characteristics of an existing lighting environment for reproduction in the lighting system of FIG. 2 or 4. FIG. 5 illustrates a simple recording system 500 that can record lighting patterns for playback in room 400 of FIG. 4. Recording system 500 includes multiple "camcorders" 510, 520, and 530 that are pointed in different directions. For example, camcorder 520 can be pointed directly up at the sky, while camcorders 510 and 530 are pointed in selected compass directions and at angles to vertical. The orientations of camcorders 510 to 530 could alternatively be selected according to the locations of luminaires in a specific lighting system, such as lighting system 400 of FIG. 4. Conventional color camcorders have only three channels (red, green, and blue), which is generally inadequate for full spectral recording desired here. Accordingly, each camcorder 510, 520, and 530 is preferably a black-and-white camcorder in which each pixel sensor is sensitive to light within a broad spectrum. Camcorders 510, 520, and 530 can be respectively equipped with collimator and prisms, diffraction gratings, or other optical elements 515, 525, and 535 that spatially separate light having different wavelengths. As a result, a given region of the spectrum, for example, light with wavelengths from 350 nm to 750 nm, is spread out over the surface of the sensor array in each camcorder 510, 520, or 530. Once pixel sensors in the camcorder are correlated to the angles over which different wavelengths of light are spread, the amount of light of a particular wavelength can be read directly from the intensity measured by the pixel sensor or sensors at a position corresponding to that wavelength.

A data recorder 550 such as a computer with software or a hardwired system can determine intensities in a set of wavelength bands and store the measured intensities in an illumination data file format that retains associated spectral, time, and spatial information. The frame rate employed for such recording in general will depend on the time scale of the lighting effect recorded. For example, a very low frame rate, e.g., less than about once per minute, may be suitable for recording a day long evolution of outdoor lighting, although a faster frame rate, e.g., 10 frames per second could be employed at sunrise or to record the lighting while a storm coming. On the other hand, lightning can travel at 60 km/s, so a capture rate of 1000 frames per second may be needed for a high fidelity recording of the illumination from a lightning strike.

Instead of black-and-white camcorders with color filters, hyperspectral cameras could be used for recording the spectral and spatial evolution of lighting. Hyperspectral cameras essentially have a spectrometer at each pixel and often have many fewer pixels than do video or digital still cameras. Hyperspectral cameras are well-known and used in applications such as remote sensing of the earth for military and environmental purposes and industrial process control. Hyperspectral cameras have the drawbacks of being expensive and generating large amounts of data, which may not be required to record lighting with suitable fidelity.

Processing of raw illumination data can make the illumination data more useful or interesting as input to a lighting system and allow convenient interaction by lighting designers, artists, and researchers. For example, in many cases, the original lighting information, such as a day of sunlight, changes very slowly, and the slow variation in lighting allows significant compression without loss of useful information. It may also be desirable to manipulate or combine recorded scenes. For example, a recording of a single candle flame could be overlaid multiple times to produce the appearance of multiple independent candles, or the intensity and spectral distribution of the candle flame can be altered to mimic the natural candle's correlated change in color temperature or to hold color temperature constant and only change the intensity. Other examples of alterations include morphing different independently recorded lighting patterns smoothly into others to form a new unique lighting pattern. Light from a sunny day could, for example, transition toward rain, then lightning. These transitions could include spectral, spatial, and temporal information.

Another aspect of the processing of the raw files would be to transform spatial or spectral information from the original recording to the actual positions and capabilities of the lights in a room. Lights would not need to be located on a grid or any specific configuration. Instead any location from grid to unique fixed locations to organic placement (simulate light through tree branches) could be chosen, and the recorded lighting data can be preprocessed or transformed for uses with the existing luminaires and in area lighting systems.

Other options for processing illumination data include temporal filtering or insertion. For example, actual illumination data can be averaged to minimize the effects of fleeting phenomenon such as clouds, sunrise, sunset, or the flickering of a flame. Alternatively, such temporary phenomenon may appear at choreographed times or be randomly inserted over a base lighting pattern representing more constant lighting such as light from a blue sky or the orange or blue body of a flame.

An author, as noted above, may alter recorded illumination data to create lighting that is pleasing artistically or achieves the author's intended effects. However, an author may alternatively create wholly new illumination data without reliance on any recorded lighting data. Similarly, a technician might also create illumination data to create a particular useful function or result such as optimizing the response of a biological system to lighting.

Luminaire 200 of FIG. 2 or playback system 450 in FIG. 4 may include data storage or ports for removable media such as optical disks or electronic memory that stores a variety of different lighting patterns. "Play lists" could thus be generated to allow a choice of scenes to illuminate a room or other area. For example, a version of "daylight" could be displayed any time as could candle light. However, specific lighting may be more appropriate at specific times, perhaps candle lighting at dinnertime and apparent sun light at others. Lighting systems could create a sunrise on the "east" ceiling transitioning through the day to sunset on the "west" ceiling. The "north" sky and "south" sky could also be represented on any part the ceiling or wall that was desired, and events such as lightning strikes and northern lights could be added for entertainment as well as useful illumination. In addition to functional or entertaining illumination, research sequences such as circadian rhythm studies could be created and included in a play list of the lighting system. Such play lists could be made available to others with similar interests and may be commercially marketed in the same manner music CDs, video disks, and MP3s and other digital entertainment are made available over the Internet.

Figure 6:
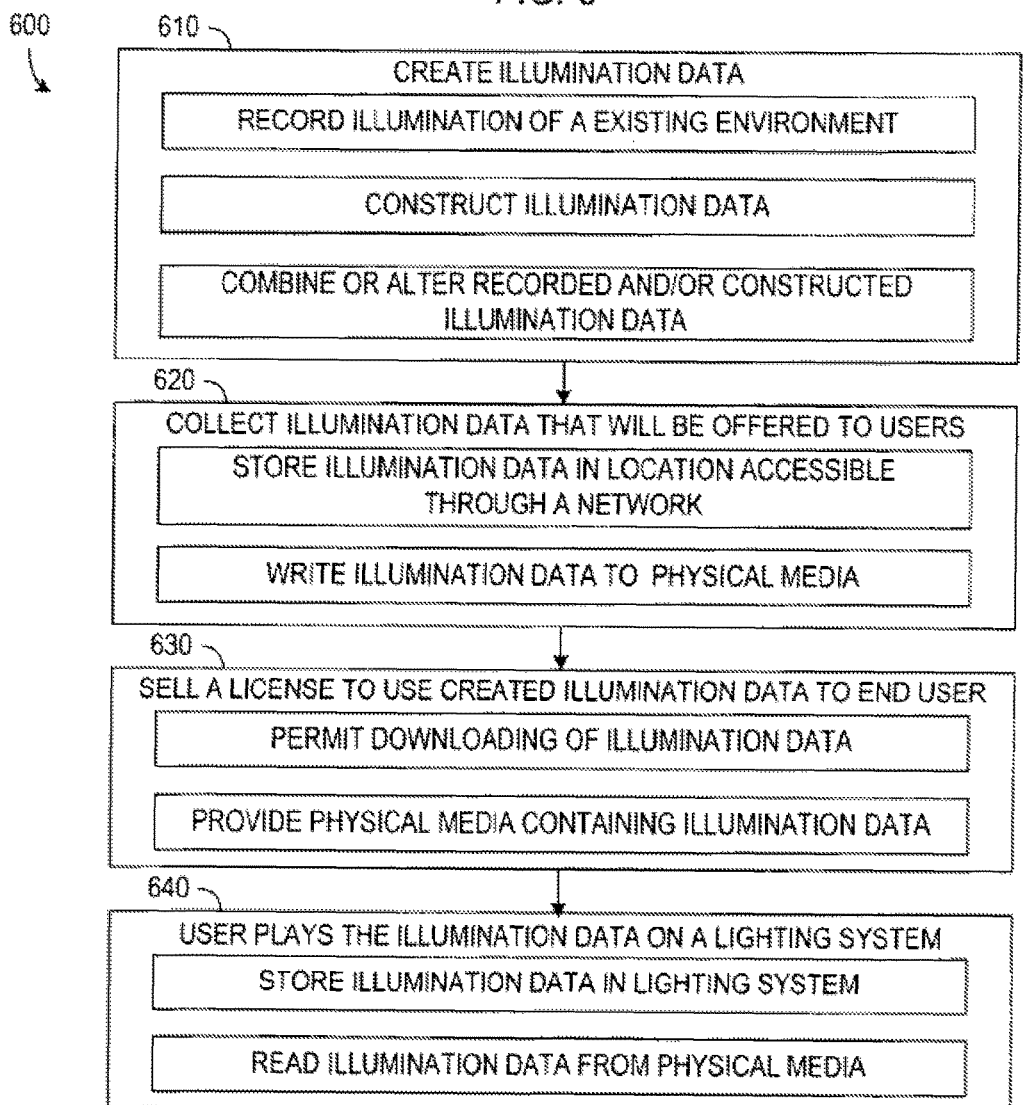
FIG. 6 is a flow diagram illustrating a business method for selling illumination data in accordance with an embodiment of the invention.

Illumination data files that are useful and in desirable formats will in general require skill to create in a similar manner to creating music. Accordingly, illumination data could be subject to legal protection as a work of authorship and may be licensed or transferred commercially. FIG. 6 is a flow diagram of a business method 600 employing the legal features of authored illumination data. The business method 600 starts with a step 610 of creating of the illumination data. The illumination data can be created using the techniques described above including recording illumination data from an environment, constructing illumination data from scratch, and combining or altering illumination data from either source. Step 620 then collects and stores illumination data that is being offered to users. For example, the illumination data can be stored in a central location such as a web site or could be stored on physical media CD-ROM or DVD-ROM. A fee for a license can then be charged as in step 620 for a user to download the illumination data via a network such as the Internet or as part of a purchase of physical media. The user can then use the illumination data in a lighting system as indicated in step 640.

Since lighting systems and each luminaire will generally have different sets of capabilities such as colors and power levels at each color, illumination data can be altered before sale to create a custom file that plays back correctly on the lighting system for which the file was intended. The alteration process can use measured characteristics of the luminaires that are recorded at the factory, and stored in the lighting system or cataloged by the serial numbers of the lighting systems. Software can in a reasonably straight forward manner convert a standardized illumination data file into a custom file (or files) to correctly playback a desired illumination. The necessary customization could be done automatically at download time by entering the serial number of the luminaire(s). Alternatively, luminaires can incorporate the necessary programs and processing power to convert a standardized illumination data file into the illumination data needed for the specific characteristics of the luminaire. Another approach would be to make each luminaire behave in a consistent manner, so that standard illumination data files could be used without alteration.

A complete set of tools to record, create, and playback illumination scenes as described above can be analogous to tools now available for entertainment industries such as the music, TV, and motion picture industries. However, the manipulations and final uses of the systems described are not limited to entertainment or human consumption. For example, in agriculture where artificial light is used, it may be desirable (to save energy) to remove the portion of the spectrum that is normally reflected by the plant (green leaf spectrum) and wasted from a biological process point of view. In industrial process control, machine vision systems could benefit from custom spectral lighting to increase speed and accuracy of the recognition system. Businesses manufacturing colored materials (e.g., paints, dyes, plastics, and textiles) could also benefit from repeatable, custom spectral lighting to improve quality and consistency of their products.

Figure 7:
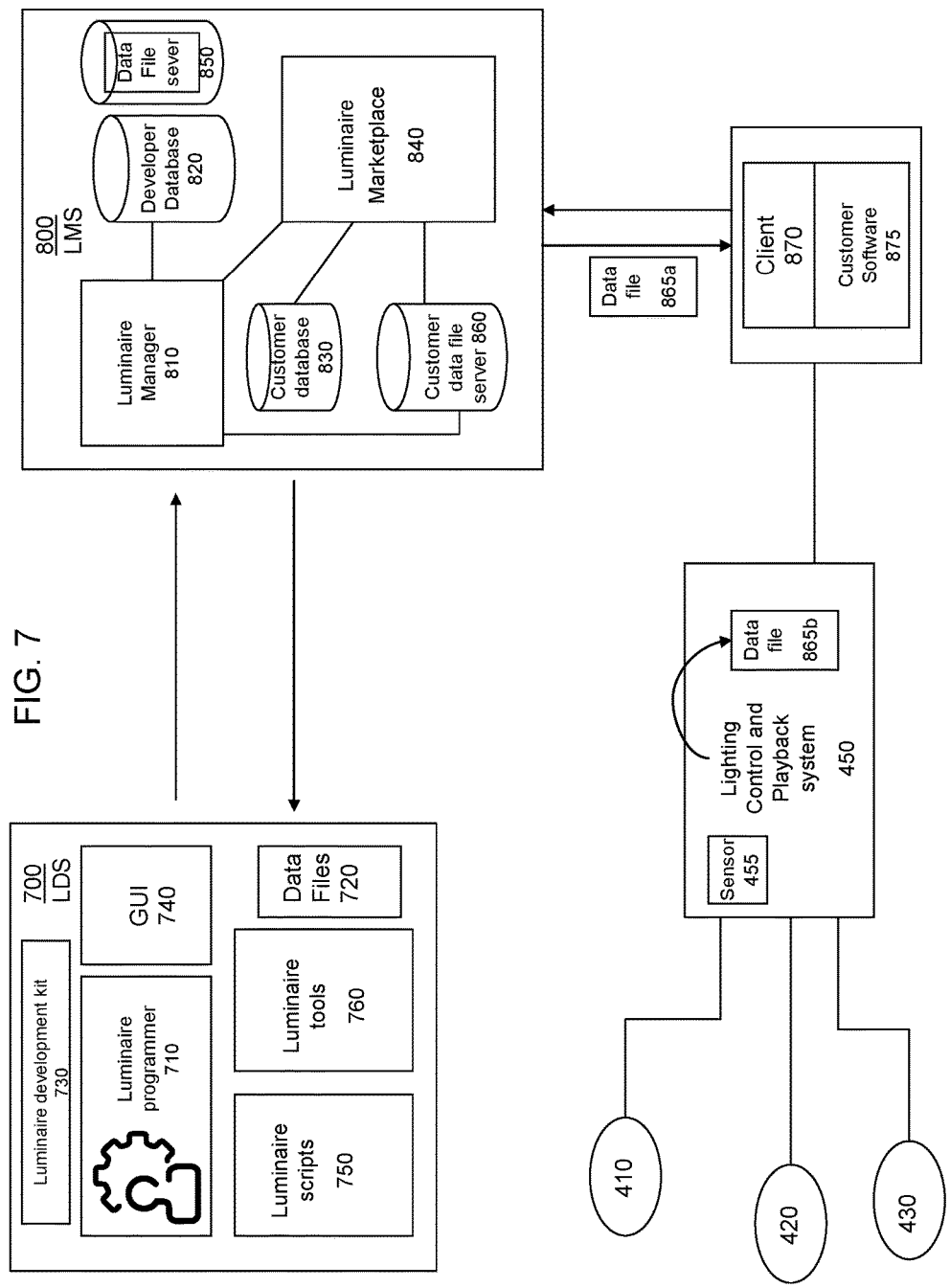
FIG. 7 depicts an exemplary system for the creation, distribution and playback of illumination data files.

Another aspect of the invention relates to the development, distribution and playback of illumination data files. FIG. 7 depicts an embodiment of a luminaire developer system (LDS) 700. The LDS allows developers and programmers, using luminaire tools and scripts, to create illumination data files for "playback" on customer luminaires 410-430. The LDS 700 may include one or more servers, clients, or distributed computers, devices or computing systems. The LDS includes a luminaire programmer 710 for developing illumination data files 720. The luminaire programmer is one of ordinary skill in the art that is capable of creating illumination data files. The LDS may also include a luminaire development kit 730, graphical user interface 740, luminaire scripts 750 and luminaire tools 760. The luminaire development kit 730 may itself include luminaire scripts and luminaire tools. The luminaire development kit may be provided to luminaire programmer by license and tracked by ID or code by the luminaire manager 810. The license, ID or code may be used to track the development activities of the luminaire programmer, his or her illumination data files 720 and payments to or from luminaire programmer. In other embodiments, the luminaire development kit is provided as open source software. It will be appreciated that the LDS may also take the form of a web portal that allows programmers to develop the illumination data files in a cloud computing environment.

These luminaire scripts and tools may include software in any programming language known to one of ordinary skill in the art, including but not limited to JAVA, Perl, C, etc. The programmer 710 may use luminaire scripts 750 and luminaire tools 760 to develop illumination data files 720. In one embodiment, the illumination data files are protected using digital rights management (DRM). The illumination data files may be encrypted so that the data can only be accessed by authorized users that have the decryption key or password. This may include public-key encryption and symmetric encryption. In one embodiment, the luminaire management system encrypts illumination data files sent to the marketplace and files downloaded by client 870 or luminaires 410-430. The lighting and control playback system 450 or client 870, using customer software 875, will have the necessary decryption key or password to use the illumination data files. Alternatively, the key or password to decrypt the illumination data files may reside in the luminaires themselves. Encrypted data files may also be exchanged between the LDS and the luminaire management system. Decryption may take place at any point in the system, depending on the security need. In another embodiment, the illumination data files may be marked by a digital watermark or similar method so that the content cannot be freely distributed and allows the author or a luminaire manager to track and monitor the distribution and usage of the illumination data files.

Referring to FIG. 7, in one embodiment, the luminaire management system 800 (LMS) is a centralized system connected to a network and capable of communicating with one or more LDS. As referred to herein, the network is not necessarily limited to an Internet network, and may include Ethernets, Local Area Networks (LANs), Wide Area Networks (WANs), wired networks, fiber optic networks, wireless networks, cellular networks, and any other networks that are compliant with data standards known to one of ordinary skill in the art, such as, but not limited to those recognized by the Institute of Electronics and Electrical Engineers (IEEE). The communication channels may be secure HTTPS, SSL or unsecure HTTP and also may include any known network or Internet security systems, including login/password, authentication, secure ID, or use of network keys. In some embodiments, the LMS 800 includes a luminaire manager 810, a developer system database 820, a customer database 830 and an online luminaire marketplace 840. Alternatively, the luminaire marketplace 840 may be independent of the LMS 800.

The luminaire manager 810 may include software and/or hardware for managing the communications between the LDS 700 and for tracking creation, uploads, downloads and payments exchanged between luminaire programmers 710 and the LMS 800. The luminaire manager may also include development software and luminaire scripts and tools for creating and processing illumination data files received from LDS 700. For example, the luminaire manager may be responsible for authenticating, licensing, ID creation, and organization of any illumination data files uploaded by luminaire programmers 710, also, herein referred to as luminists. The luminaire manager may ensure that all illumination data files comply with specified standards and quality. In one embodiment, the luminaire manager may add additional features to the illumination data files such as bug fixes, security features, proprietary wrappers (that are recognized by authorized luminaire systems) and graphical user icons that are associated with each file in the luminaire marketplace 840.

The developer database system 820 is a centralized database that contains information on luminaire programmers and programmer IDs and may include the illumination data files 720 and other programs and scripts created by programmers. In other embodiments, the illumination data files can be stored in data file server 850 or any other device connected to the network. The developer database may also include information regarding payments, licenses, software, scripts, and data files exchanged between the LDS 700 and the LMS 800. The luminaire manager can track the development of illumination data files by assigning a unique code or ID to each data file created by programmers. In one embodiment, the codes or IDs may be programmer specific, thus allowing the LDS to track the productivity of each luminaire programmer 710.

The luminaire marketplace 840 is an e-commerce system that is accessible by consumers wishing to purchase or download illumination data files. An example of an e-commerce system is one that allows a customer, using, for example, a web browser, to login to a commerce server on the Internet (that has information on products, such as price, availability, etc.) and further allows the user to purchase or download files from a commerce server or similar servers or computer systems. In this case, the product may consist of customer illumination data files.

Here, in FIG. 7, the marketplace is depicted as part of the LMS 800. However, it will be appreciated that the marketplace may exist in a separate network, on the Internet, and/or behind an enterprise firewall. The marketplace may also make use of third party systems such as PAYPAL™, which allows customers to make secure payments to vendors. The luminaire marketplace 840 may include servers, clients, and software and/or hardware to facilitate customer purchases and permit consumers to access customer data file server 860 for accessing customer illumination data files. The methodology of how a customer accesses and downloads illumination data files or play lists is discussed in further detail below with respect to the embodiment depicted in FIG. 9. Customer illumination data files 865a, stored, e.g., in customer data file server 860, may differ from data files 720 and those stored in the data file server 850, to the extent that they are subject to quality control, standardization and addition of security features, graphics, etc. In one embodiment, the customer illumination data files have been approved for sale by the LMS in the luminaire marketplace 840. The luminaire marketplace may include payment servers, authentication servers, security software, customer databases, and customer illumination data file servers. In one embodiment, the luminaire marketplace includes illumination data files, illumination genres and categories, and a graphical user interface for navigating the marketplace website to purchase illumination data files based on user preferences, search queries, recommendations and so on.

The customer database 830 includes information identifying individual purchasers of customer illumination data files, payment information as well as information on user preferences, purchasing habits and licenses for use of illumination data files. The customer database 830 may be a part of luminaire marketplace 840 or a stand alone computer or server.

The luminaire marketplace 840 enables a customer using a client 870 or computer to purchase customer illumination data files, which may be stored in customer data file server 860 or luminaire marketplace 840. The customer illumination data files allow a user to execute the files on lighting and control system 450 to produce the desired lighting effect on luminaires 410-430. Luminaire functionality may also be embedded in a user's light emitting diode (LED) television. For example, luminaire applications and firmware can be developed that enable a user's television set to act as a networked luminaire. An LED or similar type of TV can thus display all the same or similar lighting effects as luminaire 410-430. It will be appreciated that the client 870 may include devices such as servers, desktop computers, laptop computers, notebook computers, smartphones, mobile devices, tablet like devices, or any other mobile, enterprise, or consumer computing device that is capable of communicating over a network. It should be noted that the client functionality may be embedded in the luminaires themselves or on the lighting and control playback system 450. The luminaires may include a user interface that has the same or similar functionality as the client 870. A customer, using client 870 may connect to the marketplace 840 over a network connection and access customer data illumination files from server 860. As referred to herein, the network is not necessarily limited to an Internet network, and may include Ethernets, LANs, WANs wired networks, fiber optic networks, wireless networks, cellular networks, and any other networks that are compliant with data standards known to one of ordinary skill in the art, such as, but not limited to those recognized by the IEEE.

The communication channels may be secure HTTPS, SSL or unsecure HTTP and also may include any known network or Internet security systems, including login/password, authentication, secure ID, or use of network keys. The marketplace may have a customer account which stores a user's preferences and recent purchases. The client may download illumination data files for a fee and make a secure payment with the payment server (not shown) in the marketplace. In another embodiment, the customer may purchase and/or license illumination data files on media such as CDs, DVDs, USB drives, or any other physical storage media.

The client 870 may be a stand alone device or integrated in the lighting and control playback system 450 which, alternatively, may be connected directly to the network and luminaire management system 800 and luminaire marketplace 840. In one embodiment of the invention, the client 870 sends, upon request or automatically (depending on customer defined settings) commands to lighting control and playback system 450 to execute customer illumination data files. The lighting control and playback system is connected to one or more luminaires 410, 420 and 430. The connections between various devices and software or firmware in this system may be wired or wireless, and may include, e.g., such connections as Universal Serial Bus (USB), High Definition Multimedia Interface (HDMI), Internet, Ethernet, radio frequency, BLUETOOTH™, optical, etc. It will be appreciated that other types of connections known to one of ordinary skill in the art may be utilized.

Lighting control and playback system 450, in addition to the functionality previously described, may contain software, firmware or hardware for recognizing and validating licensed customer illumination data files 865b as means of preventing unauthorized or pirated versions of illumination data files. Also, in one embodiment, the lighting control and playback system may contain storage 260, presets 262, user files 264 and calibration 266, which were earlier depicted as part of the luminaire 200, and additional software and memory for executing lighting play lists. In certain embodiments, the storage, user preferences, calibration settings and presets are distributed in the luminaire control playback system rather than the luminaire itself.

In one embodiment, as depicted in FIG. 7, customer client 870 includes luminaire customer software 875. The luminaire customer software includes a graphical user interface (GUI) and software for managing and creating illumination data file preferences and play lists. The luminaire customer software may also include functionality to control the luminaire lighting effects as described in greater detail below. The luminaire scripts, lighting control and playback system software and luminaire customer software are sometimes collectively referred to herein as "luminaire applications." It will also be appreciated that the system can also be implemented as a web service, where a web browser can be used on client 870, the lighting and control playback system 450 and/or the luminaires 410-430. The web browser may allow a customer to login to a hosted site that has all the same functionality as customer software 875. A hosted server in marketplace 840, or other location, may allow a user to store customer illumination data files, organize play lists, and also create user preferences for alerting the user when new or preferred illumination data files exist in the marketplace. For example, the lighting and control playback system 450 may include a network connection to the luminaire marketplace where it can automatically check for updates and download customer illumination data files or demos. This function may also take place at the client 870 or on the luminaires themselves.

In another embodiment, the luminaire control and playback system 450 stores and plays user illumination play lists. Alternatively, the play lists can be stored on client 870 and executed via the luminaire customer software 875 or on the luminaire itself. The play lists, may, for example, include selected/preferred illumination data files and/or illumination data files organized in a scheduled or sequential format. Play lists permit a user to execute illumination data files at different times of the day, or according to a user's mood or custom settings. For example, the play list may include illumination data files for home settings of "morning", "afternoon" and "evening" which cause the luminaire to play different illumination data files depending on the time of the day. The play list, when executed, can play (i.e., cause to be executed) individual illumination data files each of which control the intensity, characteristic, illumination, spectral distribution and temperature of the lighting emitted from the luminaires 410-430 at various intervals in the day.

It will be appreciated that the embodiments of the invention can be extended into several consumer and practical configurations. For example, the client 870, when taking the form of a mobile device, may allow a user to control the lighting and control playback system 450 from a remote location. A user may be driving home from work and may want to signal to his wife that he is coming home. Accordingly, the client 870, using either customer software 875 or a web service application (such as an ANDROID™ or I-PHONE® application), may execute a program that in turn causes an illumination data file to play at home which changes the color or effect of the luminaire lighting (e.g., green—"I'm coming home"; or red—"I'm stuck in traffic"; yellow—"I'll be home soon"). Luminaires in airports, public places, office buildings, factories, etc., can be activated by the operator to change color or lighting effect to signal warnings, delayed flights, closure, or other hazards.

In another embodiment, the playback and play list function has important practical and environmental benefits. For example, the lighting control and playback system 450 may be connected to one or several luminaires in a building, workplace or enterprise that has multiple and differing lighting needs in various rooms or departments. Each of the customer illumination data files may be specifically tailored to different rooms, floors or departments depending on the lighting needs and can be automatically adjusted via the lighting control and playback system. This may be accomplished, for example, by playing the preset files or play lists for the building. Also, the execution of play lists can be configured for energy and cost savings by controlling, for example, the intensity and brightness of lighting in various rooms that receive natural sunlight. Thus, an office with a window that receives constant natural lighting for six hours a day may have an illumination data file, as part of the play list, which is programmed to dim the luminaire during bright daylight hours, and increase the brightness and intensity when levels of natural lighting have diminished.

In yet another embodiment of the invention, the lighting control and playback system 450 has one or more sensors 455, e.g., photovoltaic sensors, that are capable of measuring the level of lighting in the room and sending a signal to a controller in lighting control and playback system 450, which in turn would play or execute a certain illumination data file or play list associated with the measured value of the signal coming from the sensor. In this way, the lighting control and playback system 450 has a feedback system that allows it to provide optimal energy efficient lighting to the room. In some embodiments, the sensors may be on the luminaire itself or in other locations throughout the home or building.

In addition, the customer software 875 allows a user to control all aspects of lighting at home or work by programming the lighting control and playback system to turn lights on and off at certain times of the day and adjust the luminaires to provide the desired lighting effect, such as mimicking the effects of noon sun, sunset, moonlight, candlelight, blacklights, or other ambient effects. This can be done thorough the use of play lists or scheduled programming.

It will be appreciated that the luminaire, like a TV or networked media device, is capable of streaming illumination data files, much like a user streams video, music or other content over the Internet. The luminaire marketplace may be designed to contain play lists or streaming illumination data files in various genres and categories that can then control the lighting on the customer's luminaire. A user may subscribe to a play list or luminaire station in the marketplace. For example, a user may decide to stream the lighting for "a day at the beach". In this example, the luminaire marketplace will stream illumination data files to the client 870, lighting and control playback system 450 and/or the luminaires 410-430 that correspond to various lighting effects mimicking a day at the beach. Illumination data files or play lists can also be suggested or tailored to customers and/or specific luminaires, based on, e.g., the customer habits, tastes, preferences, or the personality of the luminaire. (The "personality" of the luminaire is described in more detail below). The streaming or usage of illumination data files can be monitored by the LMS or other remote server. A payment system may include charging customers based on their time usage of illumination data files or play lists.

It will also be appreciated that the luminaire marketplace can enable collaborative social networking for luminaire customers to share their preferences, discuss lighting effects, and display their customer personalities. In this way, users of luminaires will get exposure to a variety of different lighting effects and feedback from other customers. In one embodiment, a user may connect to other luminaires to share illumination data files or network with other users to stream their play lists to his or her own luminaire.

In another embodiment, music files may be combined or synchronized with illumination data files so that the luminaires display lighting based on the sound effects of music. An illumination data file may contain scripts that are programmed to execute different types of lighting colors, intensities or effects which are correlated to specific sound frequencies, notes, or songs. For example, a user listening to a certain song, whether it be his or her own audio file (e.g., MP3, wave file, etc.) or a song streamed from the marketplace or other website, can enable his or her luminaire to display lighting effects uniquely tuned to each song. For example, classical music make take on various lighting effects depending on whether you are listening to composers such as Beethoven, Mozart, or Stravinsky. Jazz, rock or techno music may evoke another type of effect or play list.

In other embodiments of the invention, luminaires will bear certain categories of characteristics. These characteristics taken together comprise the "personality" of the light unit and the environment in which the light is displayed. By categorizing these personalities, the marketplace 840 can recommend and maintain the software, lumenscripts and applications installed on particular luminaires or client devices and software can behave in an appropriate manner given known personalities of consumer luminaires.

The "personality" of a luminaire may take into account a number of technical factors regarding the luminaire unit, such as the light output, lumens/watt efficiency, etc., which account for performance versus longevity of the luminaire unit. The "personality" of the luminaire may also be configured to take into account color fidelity, which may factor for the number of color channels, peak wavelength of each channel, lumen output, resolution of output control, and temporal response resolution.

Automatic updating of the luminaire software and firmware is another feature of embodiments of the invention. Software/firmware updates may be subscribed or "pushed" (on an opt-in or opt-out basis) based on personalities of the luminaire (for example, based on storage capacity and fidelity). Illumination data files, applications, updates, upgrades and bug fixes may also be subscribed or pushed to the user depending on preferences. For example, a building manager may subscribe to energy efficient illumination data files for lighting a building, whereas a restaurant owner may subscribe to or have preferences for ambient restaurant lighting suitable for Mediterranean themes. Additionally, lumenscripts and updates for lumenscripts may be suggested based on the storage and fidelity personality of a unit (for example, an update to smooth 32-color representations may not be pushed to a 16-color unit).

A luminaire personality may also have sensor fidelity, that is knowing the sensor personality of a unit will suggest what software configurations are appropriate and likewise, knowing a sensor personality is deficient for a popular application can suggest a hardware upgrade. The sensors may be present on the luminaires themselves or external devices such as a window or the outside of a building or home. The sensors are coupled to the luminaires, the lighting and control playback system or somewhere inside or outside the house or building. A sensor may be a simple light or motion sensitive device. In certain embodiments, the sensor 455 may be an intelligent sensor capable of measuring environmental factors such as temperature, humidity, sound levels, sound patterns, heart rates, infrared radiation, telephone rings, oxygen and carbon dioxide levels, and other factors which may be important to light sensitive bio-rhythms. The sensors may take the form of photovoltaic or spectrometer sensors or any other measuring devices known to one of ordinary skill in the art.

As previously mentioned, the luminaire sensors can be sensitive to the time of the day and/or time of year, and can provide feedback to the luminaires or the lighting control and playback system to mimick or represent a desired time, geographic location, or environmental setting. The sensors may also be weather sensitive and capable of providing feedback to the luminaires or lighting control and playback system to execute specific illumination data files based on environmental conditions such as heat, snow, rain and other conditions that may affect the lighting of an interior room or building.

The luminaire applications will have a range of capability encompassing ranges of light attributes, sensor response and collaborative capabilities. Collaborative capability will include the ability of luminaires to communicate with other luminaires and a social networking portal as previously noted. A luminaire script performance may be confined if the personality of the hardware does not include the color or brightness level the lumenscript requires, or is not capable of playing illumination data files collaboratively with other units or does not include the required sensor set.

In one embodiment, the luminaire applications will have artificial intelligence scripts that are capable of measuring a number of different external factors. The luminaire applications may contain learning applications that mimick the behavior of the user, e.g., learning the lighting preferences or schedule of the user to automatically adjust the lighting depending on the user lifestyle. For example, the luminaire sensor 455 may track a user's schedule and provide feedback to the lighting control and playback system 450 which has statistical software that compiles data on the user such as the frequency of the user's movements in certain rooms, the time of day the user is at home, and the amount of time spent in various places throughout the house. The software can measure the mean values in each of these categories and cause the luminaire applications to activate the luminaires on a schedule that is based on the user's habits. For example, the luminaires may automatically turn on before the user arrives home from work or turn off after a user leaves home for work, begin dimming before the user goes to sleep, and begin brightening before the user wakes up. The luminaire applications are also capable of adjusting to an environment, both internal and external to the user's home or building. For example, if it is raining outside and there is jazz playing in the room, an illumination data file that is either set by the user's preference, or falls in the genre or category of rainy weather and/or jazz music may be executed on the lighting control and playback system to adjust the luminaires to ambient lighting appropriate for this setting. It will be appreciated that this system will have many practical applications in hotels, airports, casinos or other public places with various lighting needs. Hotels, for example, have several different lighting needs in the lobby, hallways, conference rooms, restaurants, and guest rooms. Luminaire sensors may be scattered throughout the building and will measure movements in rooms, natural lighting and also the time of the day. By use of the artificial intelligence system, the hotel can ensure that it is providing the right amount (and appropriate quality) in each area of the hotel in the most efficient manner possible. Alternatively, the luminaires can be preprogrammed by a control host to provide lighting in each setting in a scheduled manner.

The luminaires of the present invention may be installed and networked in several different settings, which may be reflected in the luminaire marketplace categories. Examples of different luminaire settings with specific applications and characteristics include: industrial, greenhouse, residential kitchen, bedroom, hallway, outdoors, office, hospital, restaurant, hotel, retail and school.

The luminaire applications may also be programmed for different occasions such as birthdays, weddings, holidays and special events, such as concerts that require timed and synchronized lighting effects. The programming of the luminaire applications can also be tailored to age groups, gender preferences, personality types (e.g., expressive, introvert, amiable, quantitative), recreational, etc. In other embodiments, the luminaire applications may reflect physiological preferences, bio-rhythms and moods.

A luminaire can also be preconfigured with all hardware and applications for the intended personalities, user preferences, and geographic location so that it ships customized for each user.

The luminaires of the present invention may also have peripheral uses and applications. For example, a luminaire may connect over a WiFi, BLUETOOTH™, radio frequency or other type of communications channel to a telephone (e.g., fixed or mobile phone), timer, doorbell, so that when the telephone or doorbell rings it triggers the luminaire to flicker or change color to alert the user that the phone or doorbell is ringing. This can act as an additional signal to the user when the phone audio is set to off or vibrate or when the user cannot hear the telephone or doorbell in another room. A luminaire may also act as a fire alarm or warning signal if it has sensors that can detect the sound of smoke alarms, smoke, climatic changes, or other triggers that may warn the user of unauthorized entries or movements. Or alternatively, existing smoke alarms and other sensors may be networked with luminaires 410-430.

Figure 8:
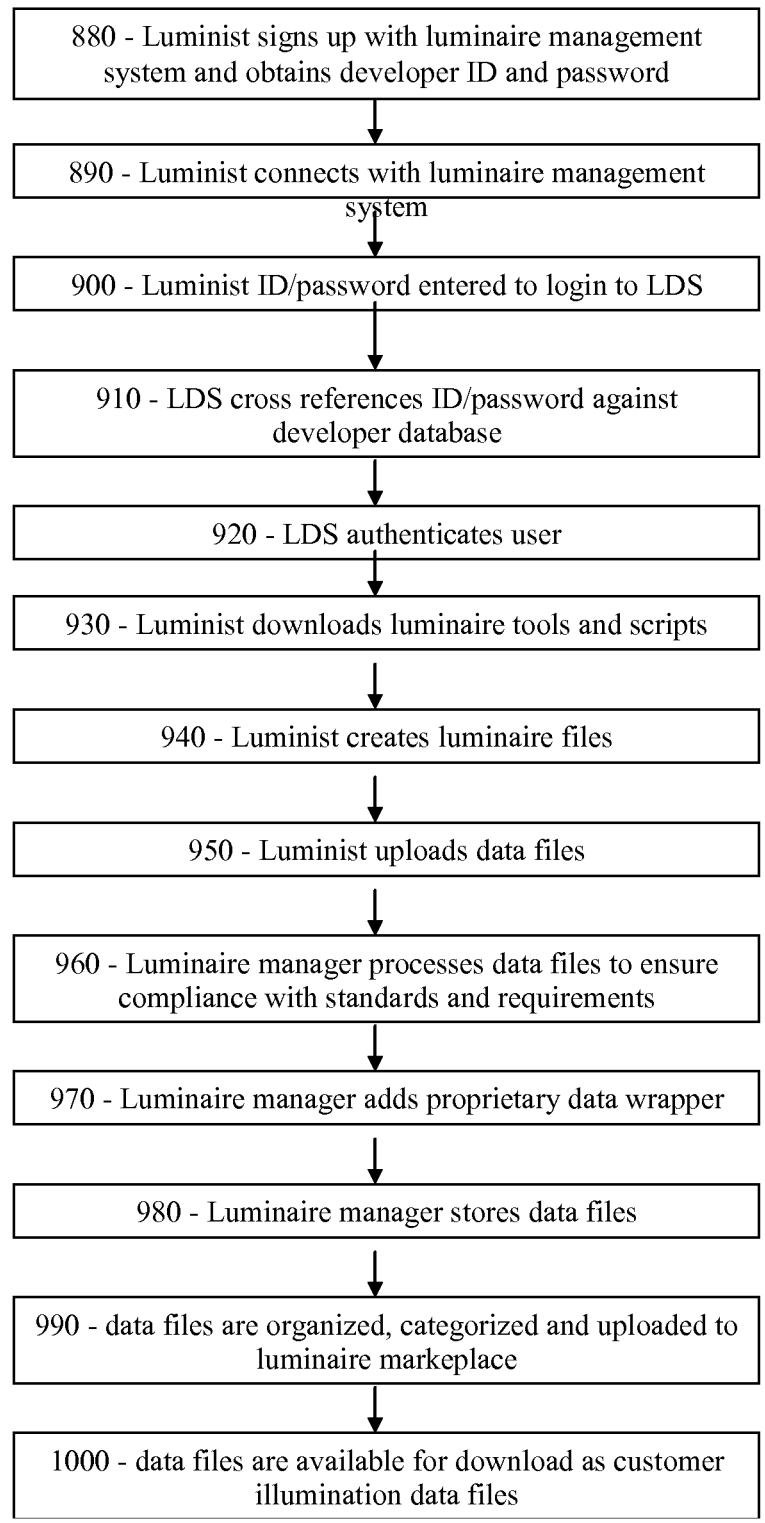
FIG. 8 is flow diagram illustrating a method for the development, validation and creation of illumination data files.

FIG. 8 depicts an embodiment of a method and process flow diagram for the development of illumination data files. In step 880, a luminist (shown as luminaire programmer 710 in FIG. 5) signs up with luminaire management system and obtains a developer ID and password. In step 890, the luminist connects with the luminaire management system. In step 900, the luminist enters the ID and password registered with the LMS to login into the developer system database 820. In step 910, the LMS cross references the ID/password against the developer's database. In step 920, the LMS authenticates the developer. In step 930, the luminist downloads luminaire tools and luminaire scripts to LDS. In step 940, the luminist, using luminaire tools and luminaire scripts creates illumination data files 720 complying with standards and formats of the LMS. In step 950, the luminist uploads the data files to the LMS. In step 960, the luminaire manager 810 processes the data files to ensure compliance with standards, formats and coding requirements. In step 970, the luminaire manager adds a proprietary data wrapper (if necessary) or encrypts the illumination data files. In step 980, the luminaire manager may store data files. In step 990, the luminaire manager organizes and categorizes approved illumination data files and transfers said files to the online marketplace 840. In step 1000, the online marketplace makes the customer illumination data files and play lists available for download by users. It should be noted the preceding steps are accomplished by computing devices with the assistance of some user and administrative action, but that all steps need not take place in the listed and/or depicted order. It will also be appreciated that the LDS and LMS may be implemented as a web service, where all luminaire tools and luminaire scripts are available as part of a cloud computing environment for registered luminaire programmers.

[1] The description of step 980 is supported in FIG. 8 of the drawings, as originally filed.

Figure 9:
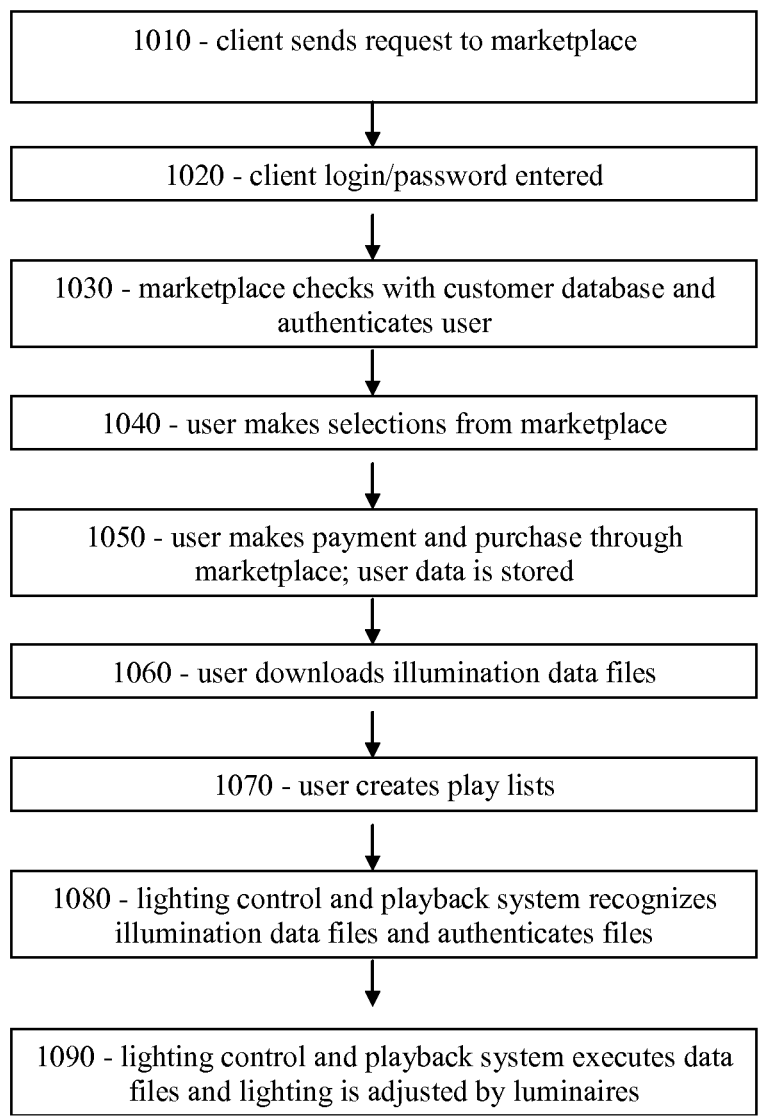
FIG. 9 is a flow diagram illustrating a method for the purchase, execution and playback of illumination data files.

FIG. 9 depicts an embodiment of a method and process for users to download and execute illumination data files. In step 1010, client 870 establishes a connection with marketplace 840. In step 1020, customer user enters a login/password. (This login and password information may be provided to user when he signs up with the marketplace). In step 1030, the marketplace checks with the customer database and authenticates the user if a match is found. If a match is found, the user can proceed to the next step. If a match is not found, the user cannot proceed to the next step. In step 1040, the user makes selections from the marketplace. In step 1050, the user makes a payment (which may be optional depending on the service) via the payment server (in the online marketplace) and the user data, such as the identity, address and purchases of the user are stored in customer database 830. In step 1060, the user downloads illumination data files. In step 1070, the user, optionally, creates one or more play lists. In step 1080 the lighting control and playback system 450 recognizes illumination data files 865a-b and authenticates files by checking for a proprietary wrapper, code or ID present in authorized illumination files. The authentication step is optional. In other embodiments, the lighting and control playback system will have decrypts the illumination data files 865a-b. In step 1090, the lighting control and playback system executes illumination data files and the lighting is correspondingly adjusted by the luminaires. In some embodiments, the user may download illumination data files for a free trial period. It will also be appreciated that the user can download entire playlists of illumination data files as opposed to single files. It should be noted the preceding steps are accomplished by computing devices with the assistance of some user and administrative action but that the preceding steps need not take place in the listed or depicted order.

In one embodiment, the luminaire customer software 875 and/or the software and firmware present in the lighting and control playback system 450 may be automatically upgraded by the luminaire management system as long as a network connection is present.

It will be appreciated that in certain embodiments, the client 870 or customer software 875 may be incorporated in the lighting and control playback system 450, or alternatively in the luminaire itself. The luminaires may also contain the functionality of the lighting and control playback system 450.

Although the invention has been described with reference to particular embodiments, the description is only an example of the invention's application and should not be taken as a limitation. Various adaptations and combinations of features of the embodiments disclosed are within the scope of the invention as defined by the following claims. It should also be noted that embodiments of the present invention have been described with references to various software and hardware components, some of which are depicted in the exemplary figures. One of ordinary skill in the art will recognize that modern distributed computing system allow software and/or hardware components to reside in different locations, servers, clients and/or hardware or firmware components without limiting the location or function of the software, firmware or hardware components as described with reference to the exemplary embodiments and figures.

What is claimed is:

1. A lighting system comprising:
a light source with light elements and a processor;
a client device;
a hardware-implemented data storage server with a plurality of illumination data files stored thereon;
a hardware-implemented e-commerce server communicatively coupled to the data storage server and configured to selection and purchase, via an interface presented to the client device, of at least one of the plurality of illumination data files and to provide an encrypted version of said at least one of the plurality of illumination data files to the client device; and a lighting and control player communicatively coupled to the client device and the light source and configured to provide the encrypted version of the one or more illumination data files from the client device to the light source, wherein the processor of the light source is configured to (i) decrypt the encrypted version of the one or more illumination data files using a decryption key stored at the light source and (ii) direct the light source to illuminate the light elements of the light source in accordance with the decrypted version of the one or more illumination data files.

2. The lighting system of claim 1, wherein the light elements include a plurality of light emitting diodes (LEDs) and the at least one purchased illumination data file comprises computer executable instructions that, when executed by the processor of the light source, set an intensity of one or more of the plurality of LEDs of the light source.

3. The lighting system of claim 2, wherein the at least one purchased illumination data file comprises computer executable instructions that, when executed by the processor of the light source, adjust individual intensities of one or more of the plurality of the LEDs of the light source to reproduce a spectral distribution.

4. The lighting system of claim 3, wherein adjusting individual intensities of the one or more of the plurality of LEDs of the light source comprises adjusting a pulse width modulation of drive currents of the one or more of the plurality of LEDs of the light source.

5. The lighting system of claim 3, wherein adjusting individual intensities of the plurality of LEDs of the light source comprises at least one of adjusting an amplitude modulation or a pulse width modulation of drive currents of the one or more of the plurality of LEDs of the light source.

6. The lighting system of claim 3, wherein adjusting individual intensities of the plurality of LEDs of the light source comprises separately adjusting said individual intensities of the one or more of the plurality of LEDs of the light source over time.

7. The lighting system of claim 1, wherein the light source is embodied in a single device.

8. The lighting system of claim 1, wherein the at least one purchased illumination data file comprises a recording of an illuminated scene.

9. The lighting system of claim 1, wherein said hardware-implemented e-commerce server is hosted by a web service.

10. The lighting system of claim 9, wherein the client device is configured to assist the customer create, manage and access playlists including one or more of the plurality of illumination data files.

11. The lighting system of claim 1, wherein the hardware-implemented e-commerce server offers a web service for said client device to store, organize, and play one or more of the plurality of illumination data files.

12. The lighting system of claim 1, wherein illumination data stored in the plurality of illumination data files represents a range of spectral distributions to be projected by the light source within a given time period.

13. The lighting system of claim 1, wherein the plurality of illumination data files include illumination data regarding at least one of a circadian rhythm, sun light, sky light, sky light in a geographic region, sky light at a particular time of day, and a light spectrum designed for optimum plant growth.

14. The lighting system of claim 1, wherein the plurality of illumination data files includes multi-media data.

15. The lighting system of claim 1, wherein two or more of the plurality of illumination data files are coordinated to work together.

16. The lighting system of claim 1, wherein at least one of the illumination data files includes two or more subsets of data.

17. The lighting system of claim 1, wherein at least one of the illumination data files is formatted to be compatible with at least one of the client device and the lighting and control player communicatively coupled to the client device.

18. The lighting system of claim 1, wherein the hardware-implemented e-commerce server is further enabled to provide a recommendation to the customer based on at least one of a customer preference, a search query previously made by the customer, a social media account associated with the customer, and a geographic location of the user.

19. A method for a lighting system, the method comprising:
providing, by an e-commerce server, information regarding one or more of a plurality of illumination data files stored on a data storage server to a client device using a communication interface communicatively coupled to the e-commerce server and the client device, wherein a portion of the information enables a customer to select and purchase one or more of the plurality of illumination data files;
receiving, by the e-commerce server, a selection of one of the plurality of illumination data files from the client device;
receiving, by the e-commerce server, an indication that the customer has purchased the selected illumination data file;
providing, by the e-commerce server, an encrypted version of the selected illumination data file to the client device responsively to the received indication;
providing, by the client device, the encrypted version of the selected illumination data file to a lighting and control player;
providing, by the lighting and control player, the encrypted version of the selected illumination data file to a light source;
decrypting, by a processor of the light source, the encrypted version of the selected illumination data file using a decryption key stored at the light source; and
directing, by the processor of the light source, the light source to illuminate light elements of the light source in accordance with the decrypted version of the selected illumination data file.

20. The method of claim 19, wherein the selected illumination data file includes a range of spectral distributions to be projected by the light source within a given time period.

21. The method of claim 19, wherein the e-commerce server offers a web service for said client device to store, organize, and play one or more of the plurality of illumination data files.

* * * * *